US012753706B2

(12) United States Patent
Rasselkorde et al.

(10) Patent No.: US 12,753,706 B2
(45) Date of Patent: Oct. 6, 2026

(54) SYSTEM AND METHOD FOR ULTRASONIC PHASED ARRAY INSPECTION OF INTEGRAL SHROUD DRUM STAGE T-ROOT BLADES

(71) Applicant: SIEMENS ENERGY, INC., Orlando, FL (US)

(72) Inventors: El Mahjoub Rasselkorde, Murrysville, PA (US); Jeremy P. Jasikiewicz, Orlando, FL (US); Larry Himes, Greensburg, PA (US); James Alford, North Huntingdon, PA (US)

(73) Assignee: Siemens Energy, Inc., Orlando, FL (US)

( * ) Notice: Subject to any disclaimer, the term of this patent is extended or adjusted under 35 U.S.C. 154(b) by 578 days.

(21) Appl. No.: 18/230,850

(22) Filed: Aug. 7, 2023

(65) Prior Publication Data

US 2025/0052170 A1 Feb. 13, 2025

(51) Int. Cl.

| | |
|---|---|
| ***F01D 21/00*** | (2006.01) |
| ***F01D 5/30*** | (2006.01) |
| ***G01N 29/04*** | (2006.01) |
| ***G01N 29/07*** | (2006.01) |
| ***G01N 29/22*** | (2006.01) |
| ***G01N 29/26*** | (2006.01) |
| ***G01N 29/265*** | (2006.01) |

(52) U.S. Cl.

CPC ......... *F01D 21/003* (2013.01); *G01N 29/043* (2013.01); *G01N 29/225* (2013.01); *G01N 29/265* (2013.01); *F01D 5/3007* (2013.01); *F05D 2260/81* (2013.01)

(58) Field of Classification Search

CPC ... F01D 21/003; F01D 5/3007; G01N 29/043; G01N 29/225; G01N 29/265; G01N 29/07; G01N 29/262; F05D 2260/81

See application file for complete search history.

(56) References Cited

U.S. PATENT DOCUMENTS

2017/0284973 A1* 10/2017 Falter .................... G01N 29/24

FOREIGN PATENT DOCUMENTS

| | | | | |
|---|---|---|---|---|
| CN | 109490420 A | * | 3/2019 | ............. G01N 29/07 |
| JP | H-07244024 A | * | 9/1955 | ............. G01N 29/04 |
| KR | 20200017651 A | * | 2/2020 | ........... G01N 29/265 |

* cited by examiner

*Primary Examiner* — Laura Martin Sweeney
*Assistant Examiner* — Anthony W Megna Fuentes

(57) ABSTRACT

A nondestructive method for a volumetric examination of a blade root of a turbine blade while the turbine blade is installed in a turbine shaft of a steam turbine includes installing the bracket onto the outer diameter of the turbine shaft where the bracket conforms to the geometry of the turbine blade and turbine shaft, positioning an ultrasonic phased array probe on a platform face of the turbine blade and rotating the bracket around the turbine shaft for generation of a scan of a portion of the blade root, generating a scan of the desired position by directing ultrasonic waves via the ultrasonic phased array probe, and capturing reflected ultrasonic waves by a receiver to generate the scan and comparing the scan to a reference scan of the blade root to determine defects within the blade root.

17 Claims, 14 Drawing Sheets

SYSTEM AND METHOD FOR ULTRASONIC PHASED ARRAY INSPECTION OF INTEGRAL SHROUD DRUM STAGE T-ROOT BLADES

BACKGROUND

Due to high cycle fatigue stress and/or stress corrosion environment, defects such as cracks can occur in the blade roots of steam turbine blades. The blade root is inserted into the turbine circumferential blade attachments located on the outer diameter of the turbine shaft. During operation of the steam turbine, cracks can initiate at the areas of contact between the blade roots and turbine shaft. Growth of cracks in the blade root area can lead to failure, such as liberation of the steam turbine blade, and other associated components.

A current examination method for the steam turbine rotor blades requires removal of the shaft or rotor from the unit, removal of the locking plates that hold the blades in place, and then removal of a large number of blades from the turbine rotor. The inspection of the blades is done visually and/or utilizing fluorescent magnetic particle inspection. Currently, the only inspection methods possible, without the removal of the blades from the turbine shaft, are performed using audible/tactile tests, such as the ring test or other known method, can be used to identify defects in the blade roots of loose steam turbine blades, such as integral shroud drum stage T-slot or T-root blades. These methods have been proven to miss flaws in the blade roots of T-root blades.

Consequently, a non-destructive examination (NDE) method and system for inspecting steam turbine blades that can detect both surface defects as well as defects within the volume of the blade without disassembly of the rotor and the blades is desired.

BRIEF SUMMARY

In an embodiment of the present invention, a system for a volumetric examination of a blade root of a turbine blade, includes an ultrasonic phased array probe, a bracket defining a fixture, the bracket carried by and conforming to the geometry of a turbine shaft, where the probe is positioned within the fixture to position the probe to a desired position for generation of a scan of a portion of the blade root, where the probe is positioned within the fixture to position the probe to a desired offset gap for generation of the scan of the portion of the blade root, where the probe is position able within the fixture to direct a wave in a direction to allow for scanning the portion of the blade root of the turbine blade, an ultrasonic signal source connected to the probe via a line that provides an ultrasonic pulse signal, and a receiver connected to the probe via the line for receiving reflected ultrasonic pulse signals, where the scan of the portion of the blade root is generated from the reflected ultrasonic pulse signals, where the bracket is sized to fit between a first turbine stage and a second turbine stage of the turbine shaft and translates around the turbine shaft relative to a longitudinal axis, where the scan of the portion of the blade root is initiated from at least one of the inlet side or the outlet side of the blade root.

In an embodiment, the system may also include where the blade root of the turbine blade is a T-root configured to be mated with a T-slot in the turbine shaft.

The present invention advantageously allows for inspection of the blade roots of T-root style turbine blades without the removal of the turbine blades from the turbine shaft or rotor via inspection methods that are more accurate than the presently available methods that can be implemented on turbine blades that are still installed on a turbine shaft or rotor.

In one embodiment, the system of claim 2, where the portion of the blade root includes at least one fillet. The present invention can be advantageously aimed at the fillet or other areas of interest of a blade root.

In one embodiment, the system of claim 1, where the portion of the blade root that is in the scan is located on the opposite side of the turbine blade than the side of the turbine blade that the scan was initiated. The present invention can advantageously scan a side of the blade root of a turbine blade by initiating a scan on the opposite side of the blade root.

In one aspect, the system of claim 1, where the bracket further includes a probe mount that is positionable within in the fixture to define a probe offset gap. The present invention advantageously uses a fixture to locate a probe on the inlet or outlet face of a blade root and set the offset gap between the probe and platform of the blade root.

In one aspect, the system of claim 8, where the probe mount defines an offset angle between an orientation of the probe and a plane perpendicular to the inlet or outlet side of the blade root of the turbine blade and colinear with a longitudinal axis of the turbine shaft. The present invention advantageously uses the probe mount to define the offset angle of the probe thereby allowing for multiple angles to be achieved by a single fixed angle probe.

An embodiment of the system may also include where in the offset angle is within a range of 0 to 210 degrees. The present invention advantageously utilizes an offset angle between 0-20 degrees.

An embodiment of the system may also include where the bracket conforms to a feature of an outer diameter of the turbine shaft.

An embodiment of the system may also include where in the feature of the turbine shaft is a sealing feature.

An embodiment of the system may also include where the bracket further includes a scanning side and an offset gap between the scanning side of the bracket and the inlet or outlet side of a platform of the turbine blade.

An embodiment of the system may also include where the bracket further includes a plurality of rollers that allow for radial translation of bracket about an outer diameter of the turbine shaft relative to the longitudinal axis and define a bracket offset gap.

In embodiment of the present invention, a nondestructive method for a volumetric examination of a blade root of at least one turbine blade while the turbine blade is installed in a turbine shaft of a steam turbine, the method includes attaching a bracket to the turbine shaft and the turbine blade, the bracket conforming to the geometry of the turbine shaft and turbine blade. The nondestructive method also includes positioning an ultrasonic phased array probe within a mount formed in the bracket to enable the probe to translate along the geometry of the turbine shaft and turbine blade relative to a longitudinal axis to a desired position for generation of a scan of a least one portion of the blade root, generating the scan of the at least one portion of the blade root from the desired position by directing ultrasonic waves via the ultrasonic phased array probe, the generating including generating the scan by directing ultrasonic waves from the probe positioned on a side of the turbine blade to positions on an opposite side of the turbine blade so that the scan includes a reference geometry of the blade root and each of all of a plurality of fillets located on the opposite side of the turbine blade, and capturing reflected ultrasonic waves by a receiver to generate the scan and comparing the scan to a reference scan of the turbine blade to determine defects within the blade root. The present invention advantageously uses reference geometries in the turbine blade to locate the areas scanned by the ultrasonic phased array probe which allows for the scanning of multiple turbine blades, while still being able to identify areas of interest in each particular turbine blade.

An embodiment of the method may also include further includes the step of translating the bracket around the turbine shaft relative to the longitudinal axis to produce a scan of all of the turbine blades installed in a turbine stage of the turbine shaft. The method advantageously allows for the scanning of up to all of the turbine blades in a single operation while still being able to identify areas of interest in each particular turbine blade.

An embodiment of the method may also include where the desired position of the ultrasonic phased array probe is on an inlet or outlet side of a platform of the turbine blade.

An embodiment of the method may also include the step of scanning a reference geometry to establish a location within the blade root of the turbine blade.

An embodiment of the method may also include the step of distinguishing between a first turbine blade and a second turbine blade by the repetition of the corresponding reference geometry in the scan.

An embodiment of the method may also include where the reference geometry is a reference fillet. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
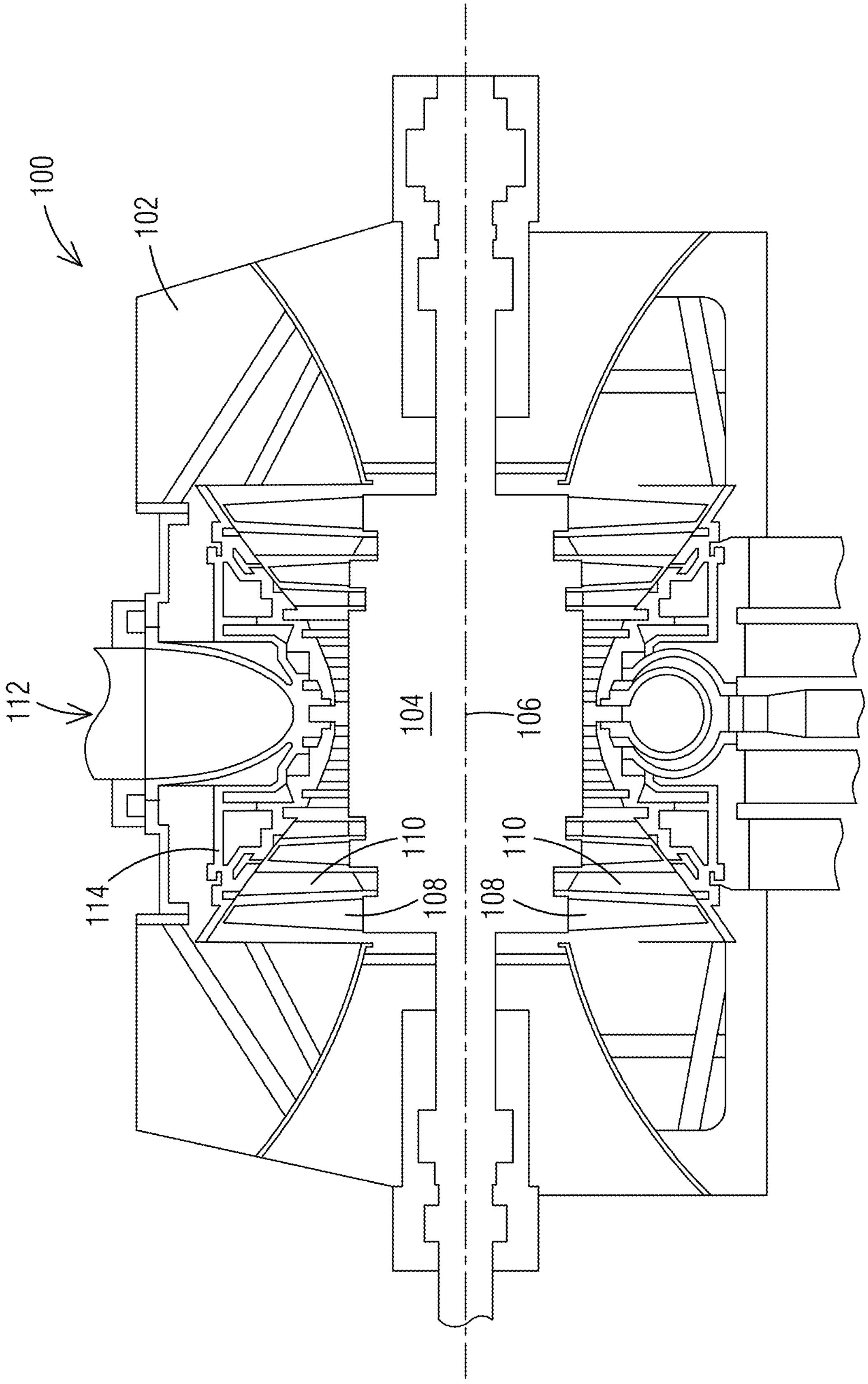
FIG. 1 illustrates a sectional view through a steam turbine.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 shows a section through a steam turbine 100. The steam turbine 100 includes an outer casing 102 and a guide vane 110. A turbine shaft 104 or rotor is supported rotatably about a longitudinal axis 106 of rotation. On the turbine shaft 104 surface a plurality of turbine blades 108 are arranged. The blade root of each turbine blade 108 is inserted into turbine circumferential rows located near the outer diameter of the turbine shaft 104. In the Inner casing 114, a plurality of guide vanes 110 are arranged to fill the gaps between the circumferential rows on the outer diameter of the turbine shaft 104. The ends of the guide vanes 110 that extend from the Inner casing 114 and are adjacent to the outer diameter of the turbine shaft 104 create a dynamic seal between the guide vanes 110 and turbine shaft 104. The turbine shaft 104 may have machined features that assist in the creation of a dynamic seal, such as groves and seal strips. In operation, steam flows into a steam inlet 112 of the steam turbine 100 where its expansion turns the turbine blades 108 on the turbine shaft 104 driving a rotor on a generator (not shown) to produce electricity.

Figure 2:
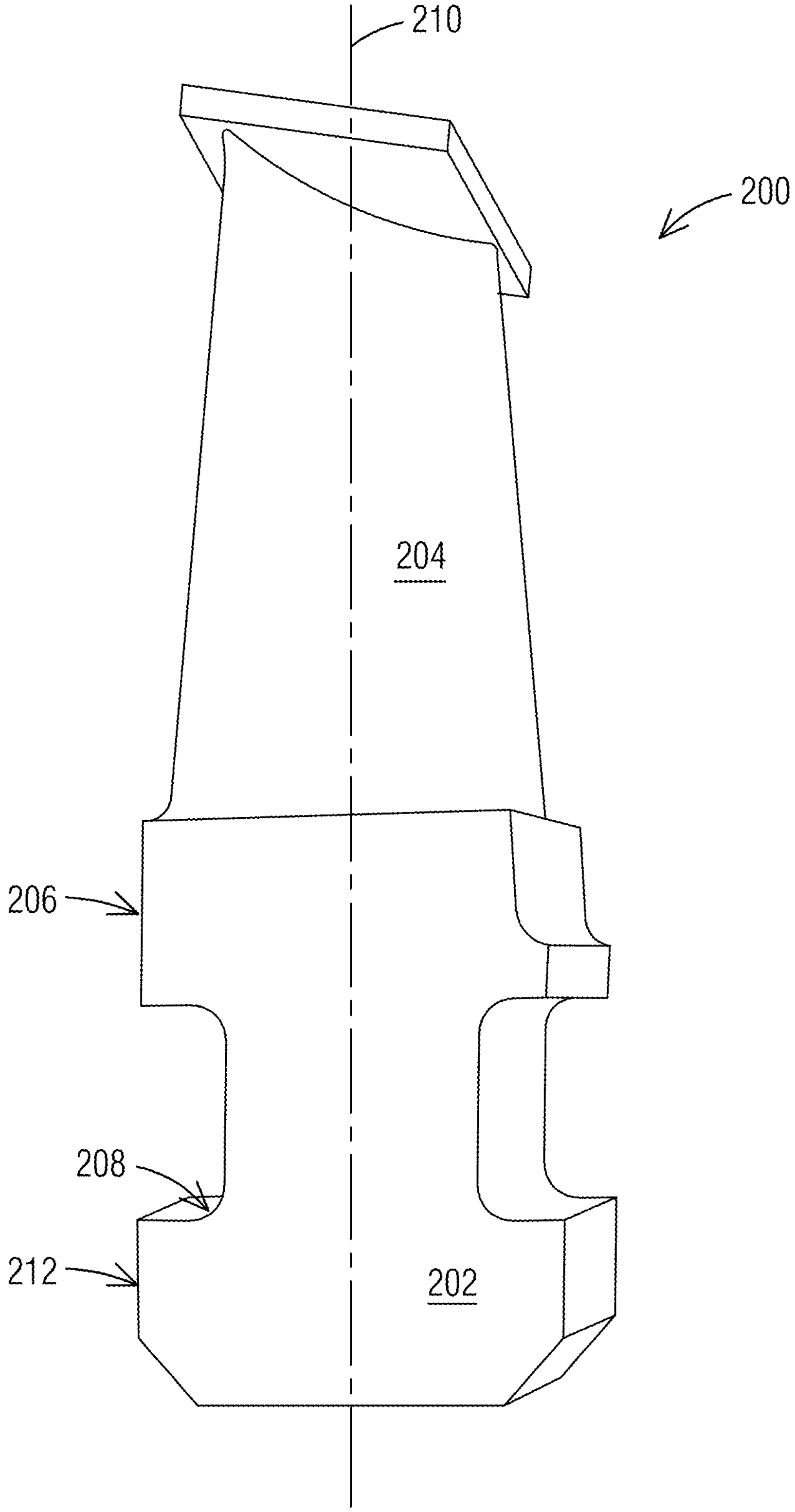
FIG. 2 illustrates a perspective view of a turbine blade for use in a steam turbine.

FIG. 2 shows a perspective view of a turbine blade 200. The turbine blade 200 includes a blade root 202 and an airfoil 204. The blade root 202 has an upper portion, commonly referred to as the platform 206 that defines an intersection with the airfoil 204. The blade root 202 has a surface substantially perpendicular to a centerline 210 of the turbine blade 200. The platform 206 has inlet and outlet faces, that correspond with the suction and pressure side of the airfoil 204 and extend in the approximately the same direction as a centerline 210. The lower portion of the blade root 202 or load bearing end 212 of the blade root 202 shown in FIG. 2 is constructed in a shape designed to mate with an inverted "T" slot of the turbine shaft 104. This type of blade root 202 design is commonly referred to as a "T-root" or "T-slot" after the inverted "T" shape. The blade root 202 includes a plurality of fillets 208 at the transitions between the horizontal and vertical portions of the inverted "T" shape. When the steam turbine 100 is in operation, high centrifugal forces occur within the blade root 202 which can propagate defects such as cracks, in the blade roots 202. High cycle fatigue can cause cracks to initiate at or around the edge of contact 404 on the Pressure side or suction side of the blade root 202, see FIG. 4. Crack growth can lead to failure, such as liberation, of the turbine blade and other associated components due to consequential damage to downstream components. When installed the platform 206 and other components of the turbine shaft 104, such as seals and blade locking hardware, prevents access to or visual inspection of the blade root 202.

Figure 3:
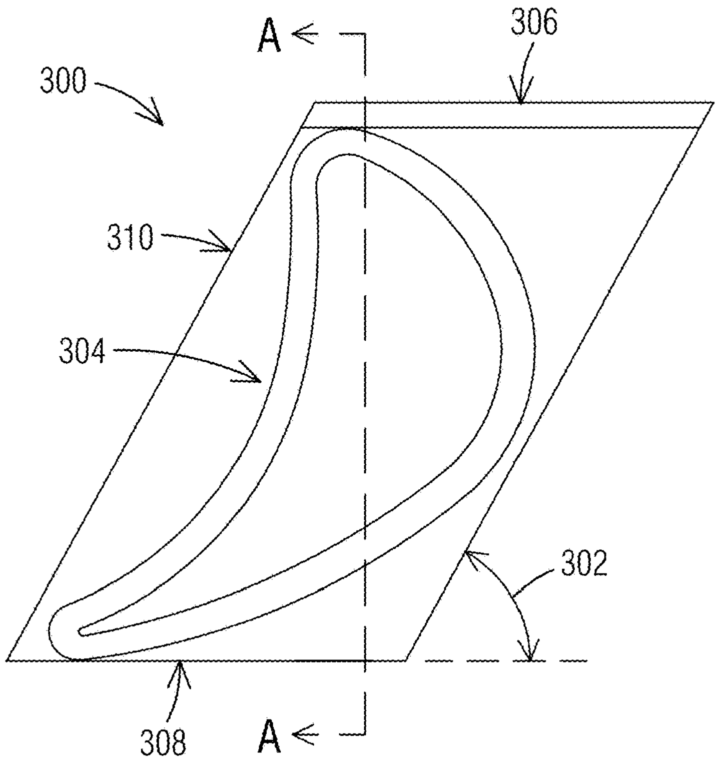
FIG. 3 illustrates an overhead view of a section of a turbine blade in accordance with one embodiment.

FIG. 3 is an overhead view of a section of a turbine blade 300. The turbine blade 300 has a skew angle 302 that defines the quadrilateral shape of the platform 310. In this embodiment the outlet face 308 and inlet face 306 of the quadrilateral shaped platform 310 are shorter in length than the sides of the platform 310 corresponding to the suction and pressure sides of the airfoil 304. The skew angle 302 defines the amount of offset from a rectangular shape that is incorporated in the turbine blade 300. The T-root shaped slot in the turbine shaft 104 is configured to accept a turbine blade 300 with a skew angle 302.

Figure 4:
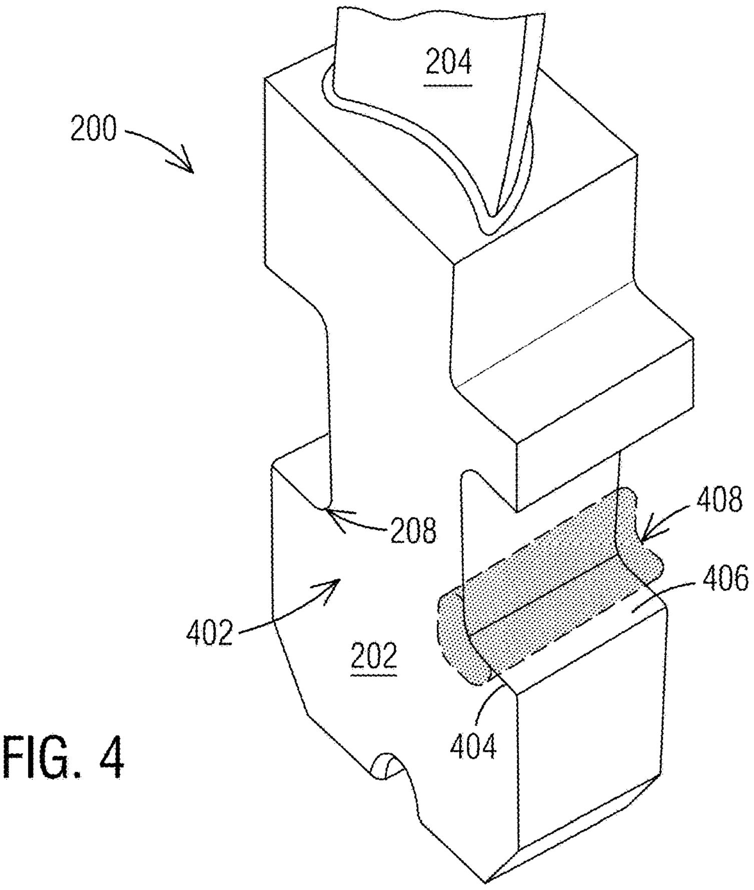
FIG. 4 illustrates an enlargement of a defect in the area of the fillet of the blade root of a turbine blade.

FIG. 4 is a perspective view of an enlargement of a portion of a turbine blade 200 with a T-root style blade root 202, a fillet 208, an area of interest 408, a pressure side 402 of the turbine blade 200, and an edge of contact 404. The edge of contact 404 is the intersection of the load bearing surface 406 of the blade root 202 and the pressure side 402 or suction side of the turbine blade 200. The edge of contact 404 can act as a stress riser during operation of the steam turbine 100. As seen in FIG. 4, the area of interest 408 is located on the load bearing surface 406 of the blade root 202 which is hidden from view when the turbine blade 200 is installed in the steam turbine 100.

Figure 5A:
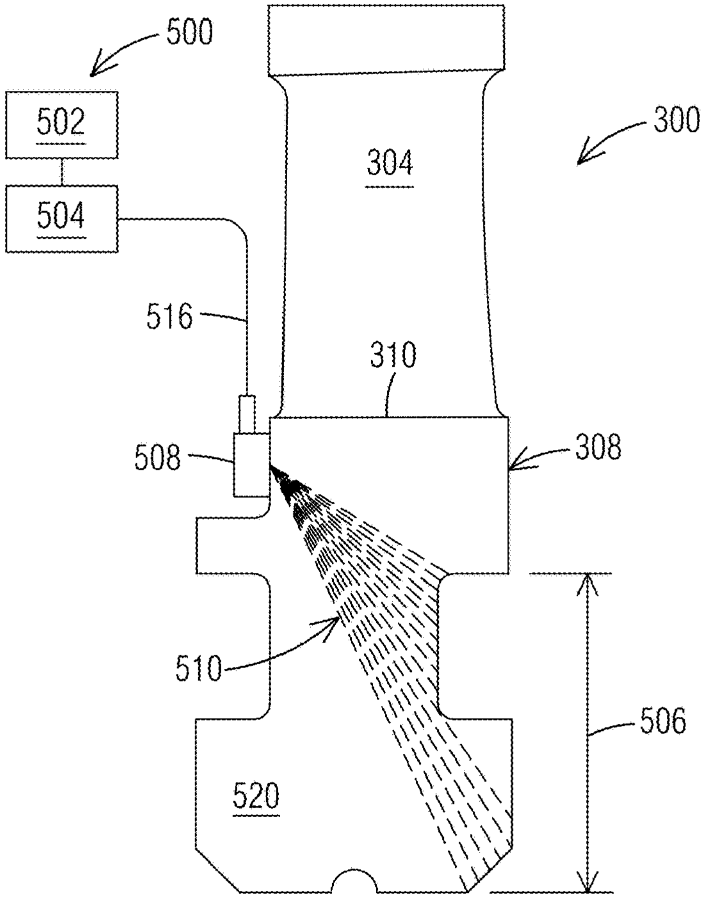
FIG. 5A illustrates a cross section of a turbine blade through cut plane A-A.

FIG. 5A is a cross sectional view of a turbine blade 300 through the cut plane A-A seen in FIG. 3. Referring to FIG. 5A, the ultrasonic phased array inspection system 500 includes an ultrasonic probe 508, a cable 516, a pulser 502, and a receiver 504. The pulser 502 and receiver 504 are shown as separate units in this embodiment but a person having skill in the art would know that these functions are typically contained within one electronic instrument. The probe 508 shown in FIG. 5A is on the inlet face 306 of the turbine blade 300. The ultrasonic probe 508 rests as close as possible to the corresponding face of the platform 310. The ultrasonic probe 508 can be positioned on either the inlet or outlet face of the blade root 520 of the turbine blade 300. The ultrasonic signal source 502/504 generates a pulsed signal making the ultrasonic probe 508 vibrate. The vibration generates ultrasonic sound waves within the turbine blade 300. The ultrasonic waves are reflected back from defects and the boundary of the turbine blade 300. The returned ultrasonic waves also vibrate the ultrasonic probe 508. The receiver 504 receives the vibrations from the ultrasonic probe 508 and converts the vibrations into signals than can be analyzed for defects. Two types of ultrasonic probes 508 may be utilized for the purpose of generating ultrasonic waves, a first probe to generate shear wave scans and a second probe to generate compression wave scans. In an embodiment, the ultrasonic probe 508 comprises an ultrasonic phased array probe. The ultrasonic sound beam can be electronically steered in the blade root to achieve the optimum beam angle(s). In one example probe 508 is placed at a desired position on the inlet face 306 of the blade root 520 such that the ultrasonic sound beam inspects both of the fillets 512 on the outlet face 308 side of the turbine blade 300 using multiple sound beam angles to inspect the areas of interest 408 of the blade root 520.

Figure 5B:
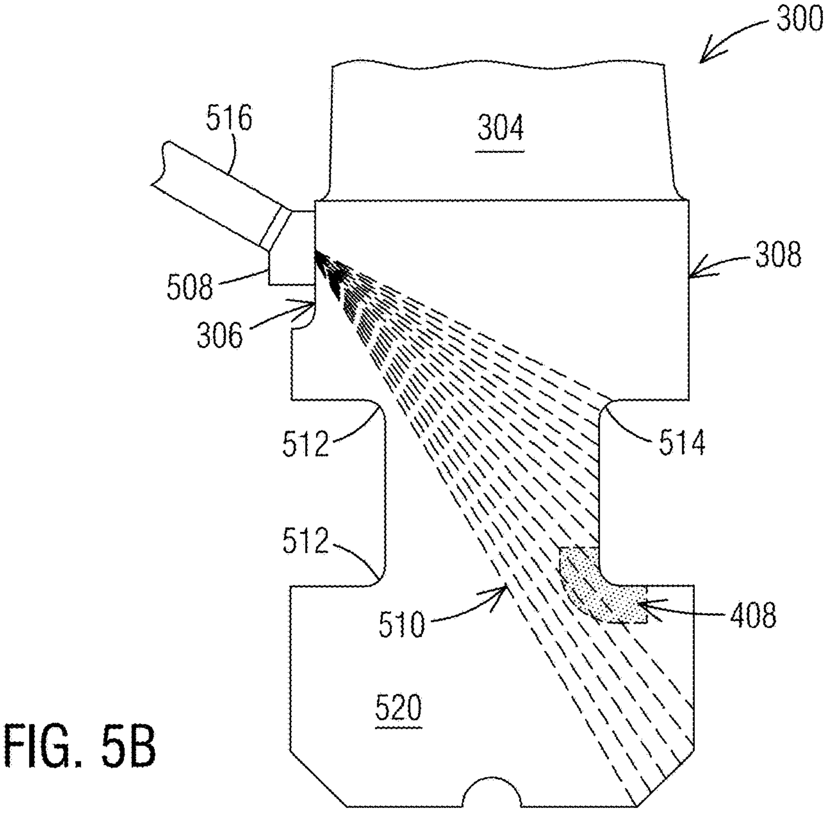
FIG. 5B illustrates a cross section of a portion of a turbine blade through cut plane A-A.

FIG. 5B is an enlargement of a cross section view of a portion of a turbine blade 300 which comprises an inlet face 306, an outlet face 308, a platform 310 of the blade root 520 a probe 508, a wave path 510, a reference fillet 514, and an area of interest 408. In FIG. 5B the area of interest 408 is represented as a crescent or elbow macaroni shaped area along the fillet 512 of the blade root 520. Within or adjacent to the area of interest 408 the ultrasonic phased array inspection system 500 can detect defects, cracks or other indications in the blade root 520. The ultrasonic waves that reflect off of the reference fillet 514 located on the non-loadbearing section of the blade root 520 (the intersection of the upper portion or platform 310 and load bearing portion 518) are used to establish reference locations in the scan of each individual blade root 520, See FIG. 5B.

Figure 6A:
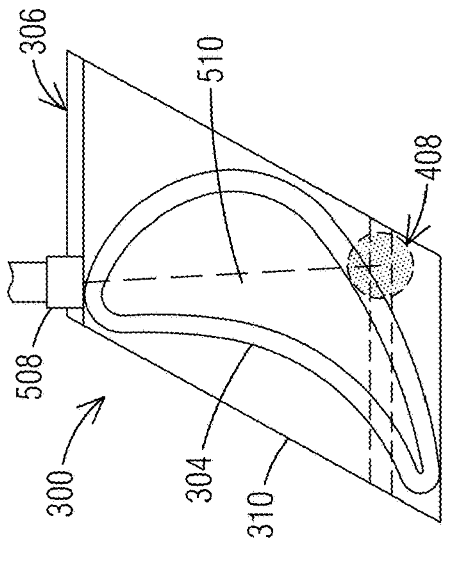
FIG. 6A illustrates an overhead view of a system in accordance with one embodiment.
Figure 6B:
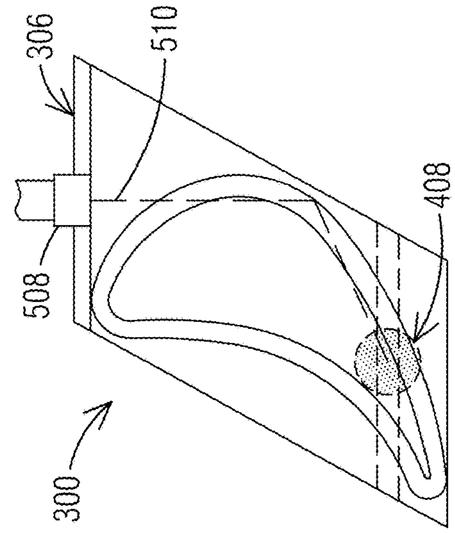
FIG. 6B illustrates an overhead view of a system in accordance with one embodiment.
Figure 6C:
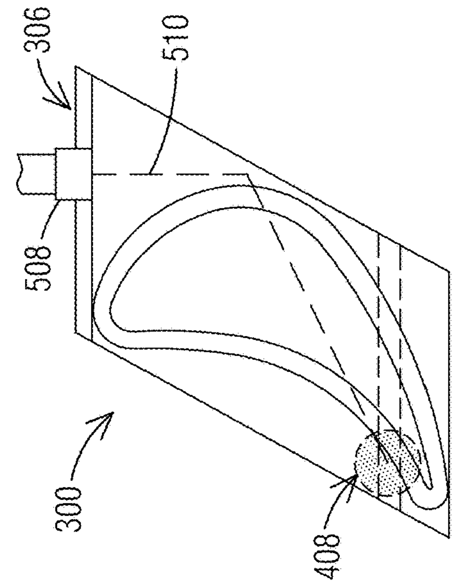
FIG. 6C illustrates an overhead view of a system in accordance with one embodiment.

FIGS. 6A-6C provide an example of an embodiment of the present invention where the probe 508 is translated or moved across the inlet face 306 of the platform 310 of a turbine blade 300, thereby inspecting the entire length of blade root 520 contained within the outlet face 308 of the turbine blade 300. The dashed or hidden lines in FIGS. 6A-6C represent the beginning and end of the fillet 512 (the transition from vertical to horizontal) on the portion of the blade root 520 targeted by the probe 508.

FIG. 6A is an overhead view of a section of a turbine blade 300 with an exemplary probe 508 positioned on the left side of the inlet face 306 with an offset angle of zero degrees between the wave path 510 and the inlet face 306, i.e. the wave path 510 has a trajectory that is perpendicular to the surface of the platform 310 on the inlet face 306 of the turbine blade 300, see FIG. 6A. The representation of the wave path 510 is represented as a line for clarity but the wave path 510 can have a sweep path or shape that is cone or polygonal in shape, as seen in FIG. 5A, which is a cross sectional view of turbine blade 300 of FIG. 3 through cut plane A-A. The wave path 510 enters the platform 310 at the inlet face 306 and passes through the blade root 520 until it reaches at least the fillets 512 on the outlet face 308 side of the load bearing portion 518 of the blade root 520 of turbine blade 300. As seen in FIG. 5A, the wave path 510 expands as it moves from the inlet faces 306 towards the outlet faces 308. The wave path 510 passes or sweeps through the blade root 520, including the area around the fillets 512 on the outlet side of the load bearing portion 518 of blade root 520 of turbine blade 300. The wave path 510 is able to contact area of interest 408 and there by cause a reflection that will register as an inconsistency in the scan of the blade root 520. In this example the area of interest 408 can contain a defect or crack which may not have propagated to the surface of the blade root 520, i.e., undetectable by visual, conventional NDE examination or audible/tactile tests. In the embodiment seen in FIG. 6A, the wave path 510 begins on the left side of the inlet face 306 and propagates to the right side of the outlet face 308 due to the skew angle 302 of the turbine blade 300.

FIG. 6B is an overhead view of a section of a turbine blade 300 with an exemplary probe 508 positioned on inlet face 306 with an offset angle of zero degrees between the wave path 510 and the inlet faces 306. In this embodiment the wave path 510 begins at a predetermined point at the center of the inlet face 306 and reflects off the boundary of the pressure side of the platform 310 and propagates to the area of the platform 310 on the near or adjacent to the center of the outlet face 308. In this manner the ultrasonic phased array inspection system 500 is able to resolve sections of the blade root 520 that are not directly across from the probe 508 or outside of the wave path 510, regardless of the shape of the wave path 510.

FIG. 6C is an overhead view of a section of a turbine blade 300 with an exemplary probe 508 positioned on inlet face 306 with an offset angle of zero degrees between the wave path 510 and the inlet faces 306. In this embodiment the wave path 510 begins at a predetermined point biased to the right side of the inlet face 306 and reflects off the boundary of the suction side of the blade root 520 and propagates to the area of the blade root 520 on the left side of the outlet face 308. In this manner the ultrasonic phased array inspection system 500 is able to resolve sections of the blade root 520 that are not directly across from the probe 508 or outside of the wave path 510, regardless of the shape of the wave path 510.

Figure 7A:
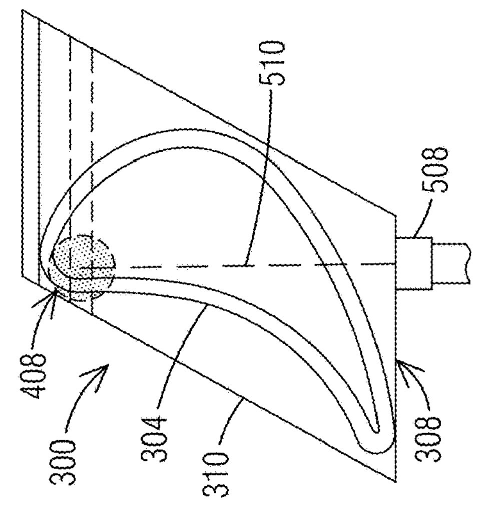
FIG. 7A illustrates an overhead view of a system in accordance with one embodiment.
Figure 7B:
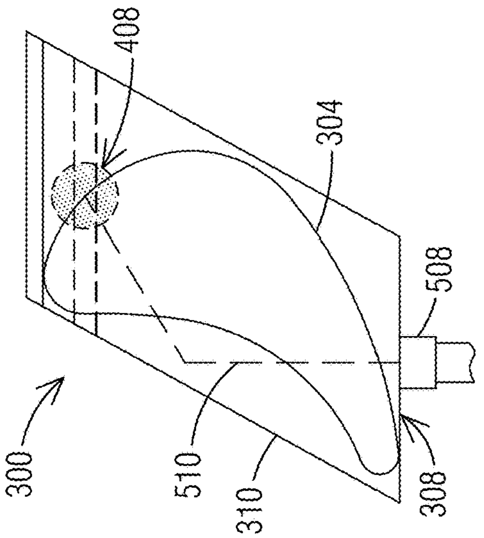
FIG. 7B illustrates an overhead view of a system in accordance with one embodiment.
Figure 7C:
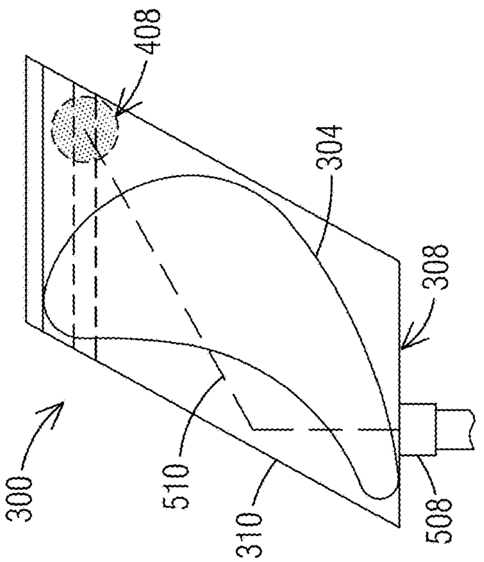
FIG. 7C illustrates an overhead view of a system in accordance with one embodiment.

FIGS. 7A-7C provide an example of an embodiment of the present invention where the probe 508 is translated or moved across the outlet face 308 of the platform 310 of a turbine blade 300, thereby inspecting the entire length of blade root 520 contained within the inlet face 306 of the turbine blade 300. The dashed or hidden lines in FIGS. 7A-7C represent the beginning and end of the fillet 512 (the transition from vertical to horizontal) on the portion of the blade root 520 targeted by the probe 508.

FIG. 7A is an overhead view of a section of a turbine blade 300 with an exemplary probe 508 positioned on the right side of the outlet face 308 with an offset angle of zero degrees between the wave path 510 and the outlet face 308, i.e. the wave path 510 has a trajectory that is perpendicular to the surface of the blade root 520 on the outlet face 308 of the turbine blade 300. A representation of the wave path 510 can better be seen in FIG. 5A, which is a cross sectional view of turbine blade 300 of FIG. 3 through cut plane A-A. The wave path 510 enters the blade root 520 at the outlet face 308 and passes through the blade root 520 until it reaches the fillets 512 on the inlet face 306 side of the turbine blade 300. As seen in FIG. 5B, the wave path 510 expands as it moves from the inlet faces 306 towards the outlet faces 308, and similarly expands from any point of origin. The wave path 510 passes or sweeps through the blade root 520, including the area around the fillets 512 on the inlet side of the blade root 520 of turbine blade 300. The wave path 510 is able to contact the area of interest 408 and there by cause a reflection that will register as an inconsistency in the scan of the blade root 520. In this example the area of interest 408 can represent a defect or crack that may not have propagated to the surface of the blade root 520, i.e., undetectable by visual, conventional NDE examination, or audible/tactile tests. In the embodiment seen in FIG. 7A, the wave path 510 begins on the right side of the outlet face 308 and propagates to the left side of the inlet face 306 due to the skew angle 302 of the turbine blade 300.

FIG. 7B is an overhead view of a section of a turbine blade 300 with an exemplary probe 508 positioned at the center of outlet face 308 with an offset angle of zero degrees between the wave path 510 and the outlet face 308. In this embodiment the wave path 510 begins at a predetermined point near the center of the outlet face 308 and reflects off the boundary of the pressure side of the blade root 520 and propagates to the area of the blade root 520 at or near the center of the inlet face 306. In this manner the ultrasonic phased array inspection system 500 is able to resolve sections of the blade root 520 that are not directly across from the probe 508 or outside of the wave path 510, regardless of the shape of the wave path 510.

FIG. 7C is an overhead view of a section of a turbine blade 300 with an exemplary probe 508 positioned on the left side of outlet face 308 with an offset angle of zero degrees between the wave path 510 and the outlet face 308. In this embodiment the wave path 510 begins at a predetermined point biased to the left side of the outlet face 308 and reflects off the boundary of the pressure side of the blade root 520 and propagates to the area of the blade root 520 on the right side of the inlet face 306. In this manner the ultrasonic phased array inspection system 500 is able to resolve sections of the blade root 520 that are not directly across from the probe 508 or outside of the wave path 510, regardless of the shape of the wave path 510.

In an embodiment of the present invention the ultrasonic phased array inspection system 500 utilizes a bracket assembly 800 to scan the blade root 520 of the turbine blades 300 while they are installed within the steam turbine 100. Referring to FIG. 1, with the blade path of the steam turbine 100 exposed the bracket assembly 800 can be fit in-between various stages of turbine blades 108 in the spaces occupied by the sealing features of the guide vanes 110. In the partial cross section seen in FIG. 8, the bracket assembly 800 is installed on the outer diameter of the turbine shaft 104 or remaining sealing features. The fixture 804 of the bracket assembly 800 is contoured to match the curvature of the turbine shaft 104 or sealing features. The fixture 804 is designed to receive the mount 806 at a predetermined location relative to the radial distance from the longitudinal axis 106 such that the probe 808 is positioned against the corresponding inlet or outlet face of the platform 310 of the turbine blades 300. The bracket assembly 800 has a handle 812 attached to the handle frame 802 which can be used to move the bracket assembly 800 around the longitudinal axis 106 of the turbine shaft 104. The bracket assembly 800 allows the ultrasonic phased array inspection system 500 to scan a single, multiple or all of the turbine blades 300 in a particular turbine stage by being rotated around the turbine shaft 104.

Figure 9:
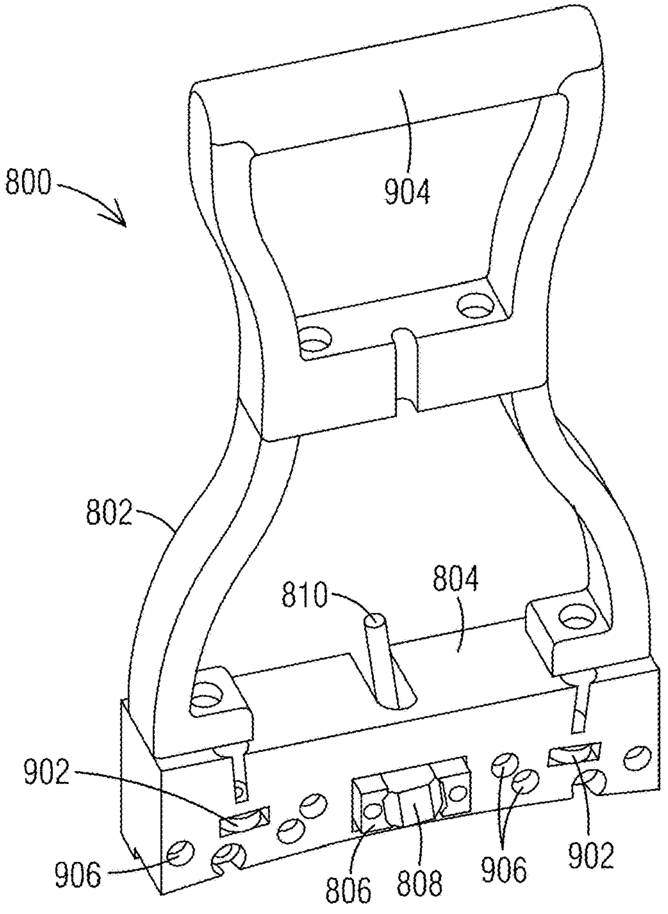
FIG. 9 illustrates a perspective view of a bracket assembly in accordance with one embodiment.

FIG. 9 is an embodiment of a bracket assembly 800 that comprises a handle frame 802, a fixture 804, a mount 806, a probe 808, a cable 810, a roller 902, a handle 904, and a series of counter bores 906. Magnets can be incorporated into the fixture 804 within in the counter bores 906 or other known method of attachment. The magnets can be affixed to the fixture 804 or mount 806 to urge the probe 808 against the corresponding inlet or outlet face of the platform 310 of a turbine blade 300. The rollers 902 allow for the bracket assembly 800 to smoothly move from one blade to another. Additionally, the rollers can set a gap between the mount 806 and the platforms 310. The mount 806 can extend beyond the face of the fixture 804 to allow the probes 808 to contact the platforms 310, see FIG. 9.

Figure 8:
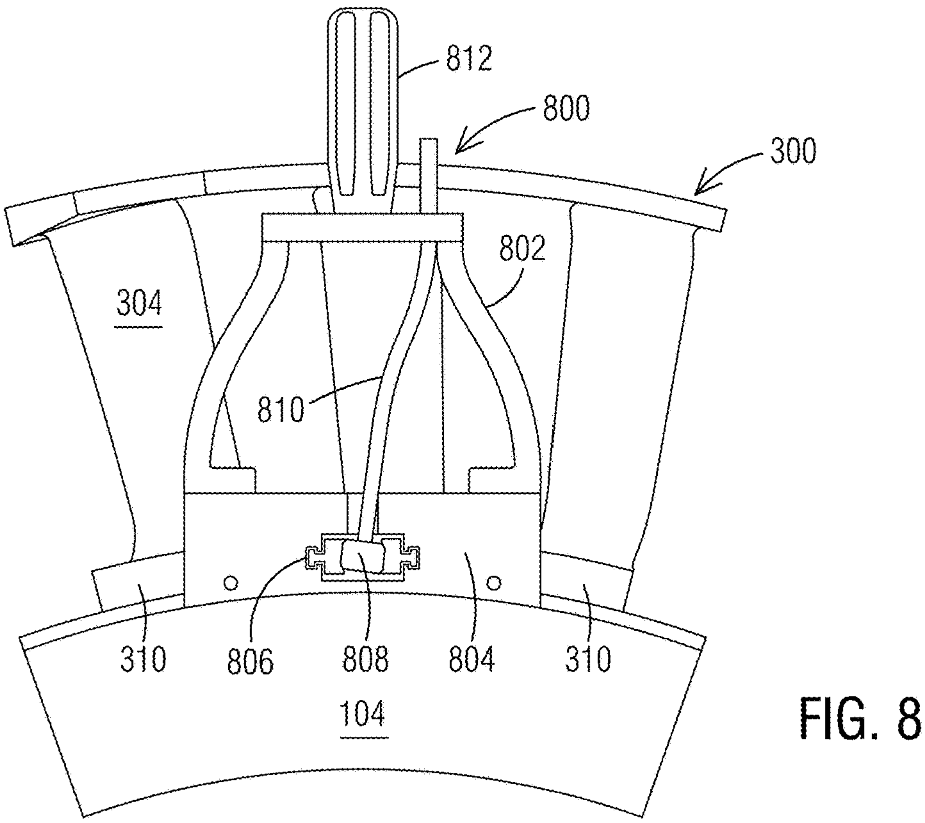
FIG. 8 illustrates a front view of a bracket assembly installed in a partial section of a steam turbine.
Figure 10:
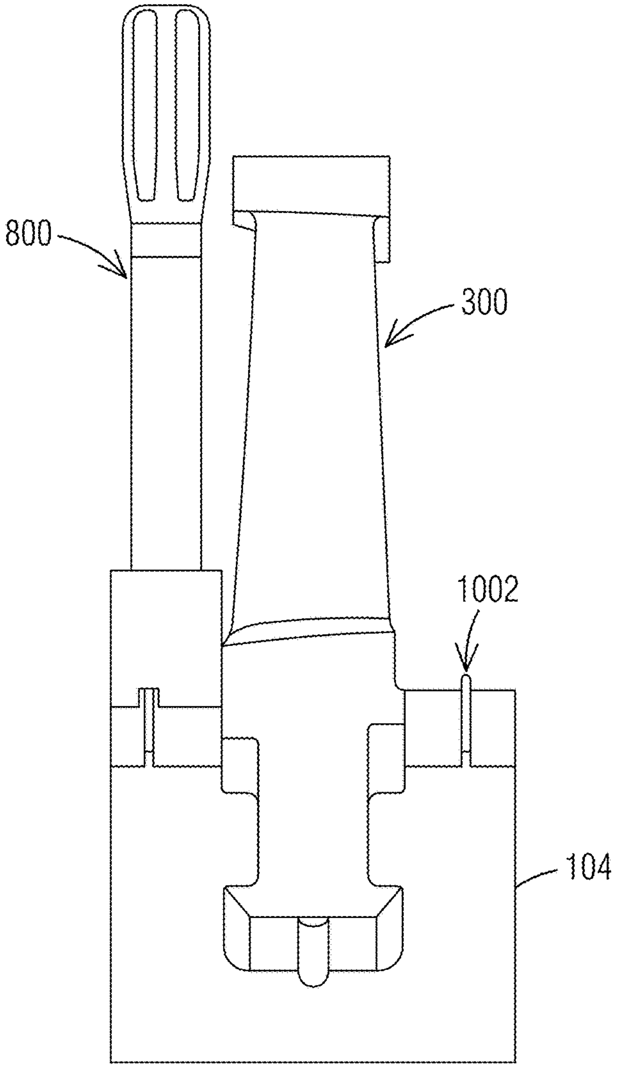
FIG. 10 illustrates a side view of a bracket assembly installed in a partial section of a steam turbine.

FIG. 10 is a side view of the partial cross section of FIG. 8, which show the bracket assembly 800 installed on the outer diameter of the turbine shaft 104. The bracket assembly 800 can be installed directly on the outer diameter of the turbine shaft 104 or be installed on a sealing feature, such as an interstage seal (not shown) that is installed between the bracket assembly 800 and turbine shaft 104. In this embodiment the turbine shaft is shown with a single raised sealing feature 1002 which is part of a labyrinth seal which may include several raised sealing features 1002.

Figure 11:
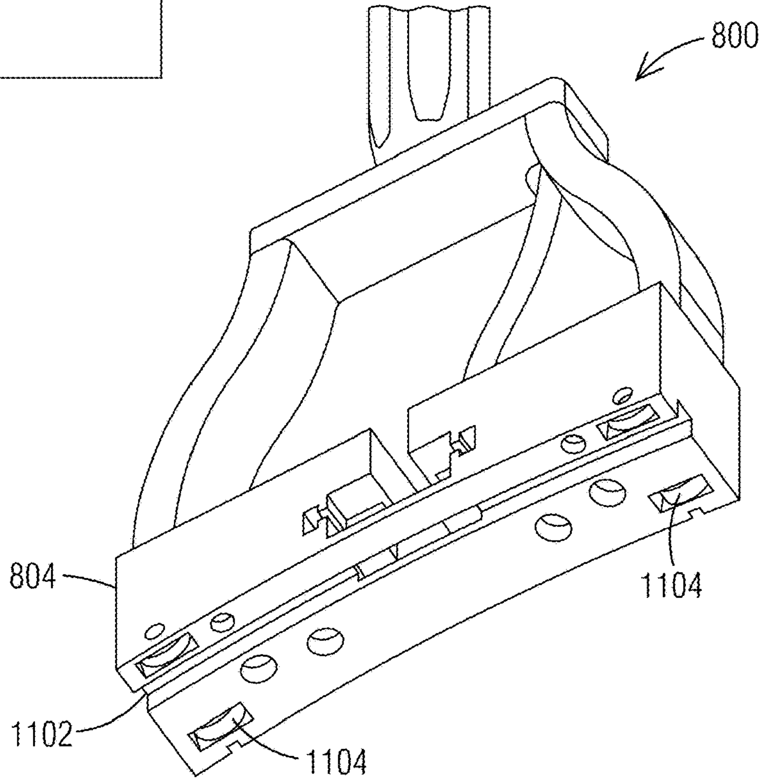
FIG. 11 illustrates a perspective view of a bracket assembly in accordance with one embodiment.

The fixture 804 includes a slot 1102 configured to accept the sealing feature 1002, as seen in FIG. 10 and FIG. 11. Other embodiments of the fixture 804 can include a plurality of slot 1102 to correspond to a plurality of sealing features 1002. As seen in FIG. 11, the fixture 804 can include a plurality of rollers 1104 designed to allow the bracket assembly 800 to roll around the turbine blade when installed. The rollers 1104 can set a desired gap between the bracket assembly 800 and the turbine shaft 104 or sealing feature.

Figure 12:
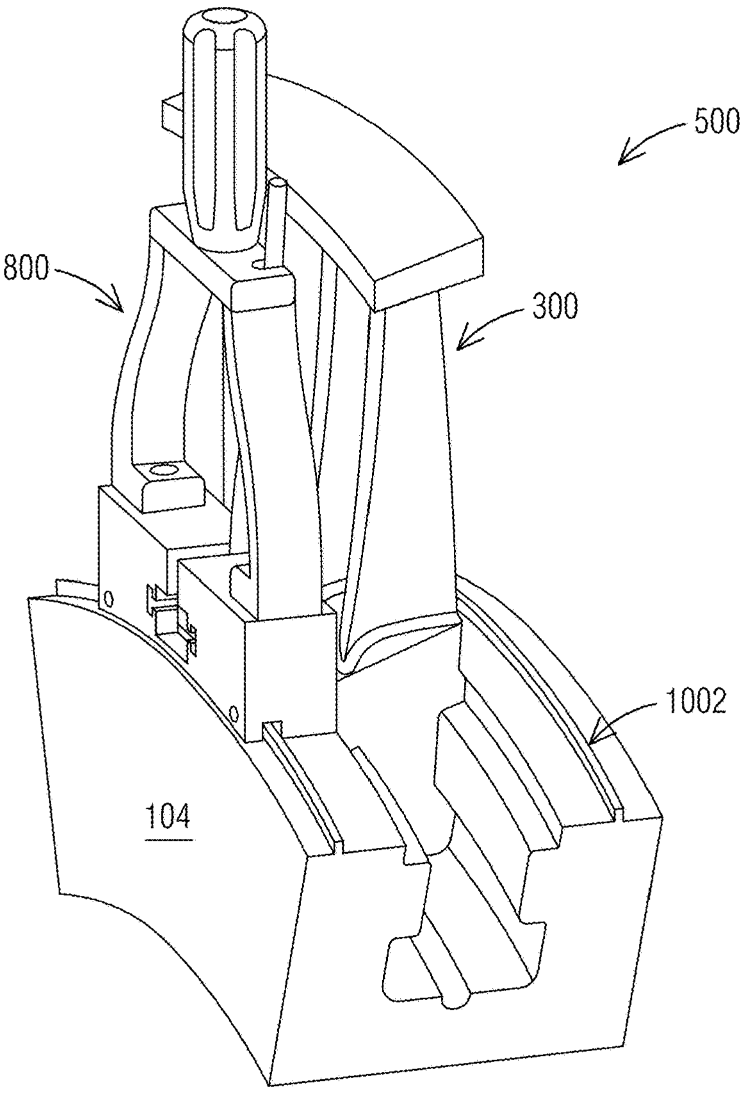
FIG. 12 illustrates a perspective view of a bracket assembly installed in a partial section of a steam turbine.

FIG. 12 is a perspective view of the partial cross-sectional view of FIG. 8.

Figure 13:
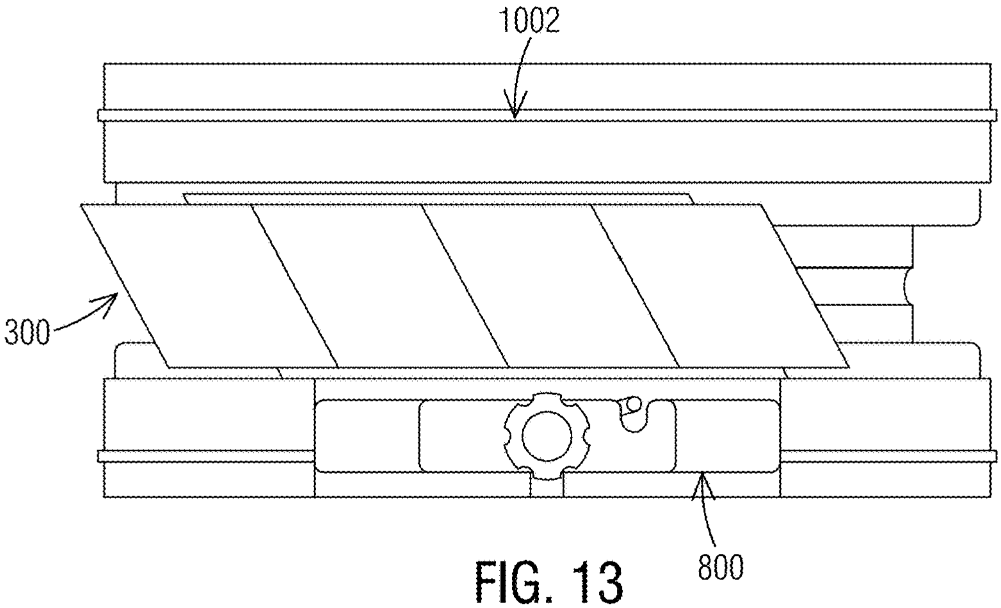
FIG. 13 illustrates an overhead view of a bracket assembly installed in a partial section of a steam turbine.

FIG. 13 is an overhead view of the partial cross-sectional view of FIG. 8.

Figure 14:
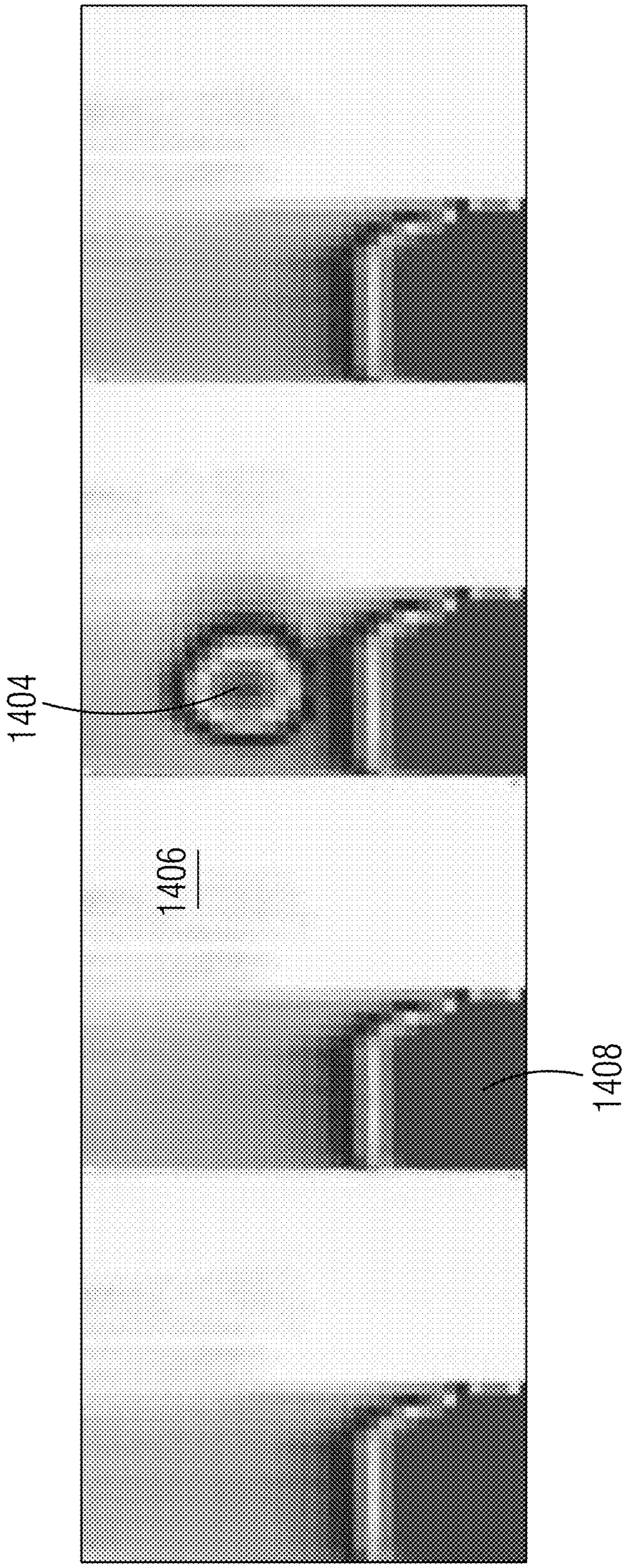
FIG. 14 illustrates a scan in accordance with one embodiment.

FIG. 14 is a visual representation of a continuous scan of several T-root style turbine blades in accordance with an embodiment of the ultrasonic phased array inspection system 500. In an embodiment of the present invention the system 500 utilizes a bracket assembly 800 to scan the blade root 520 of the turbine blades 300 while they are installed within the steam turbine 100 and produce a continuous scan of a single, multiple, or all of the turbine blades 300 of a particular stage. As seen in FIG. 5A and FIG. 5B, the sweep angle 506 of the wave path 510 includes the reference fillet 514 or upper fillet of the turbine blade 300, the vertical portion of the blade root 520 between the fillets 512 and the lower fillet 512. Areas of interest 408 generally initiate at or near the edge of contact 404 on the load bearing surface 406 of a blade root 520. For this reason, the visual representation of the scan 1406 will appear as a repeating pattern with the reference fillets 514 and other geometries creating a predictable set of reference geometries 1408 in the scan 1406 that serve as locating points that delineates between one blade root 520 and another. In this manner, defects 1404 will appear in the scan 1406 in areas of the scan 1406 that correspond with the location of the fillets 512 as determined by the reference geometries 1408 produced by the reference fillets 514.

Figure 15:
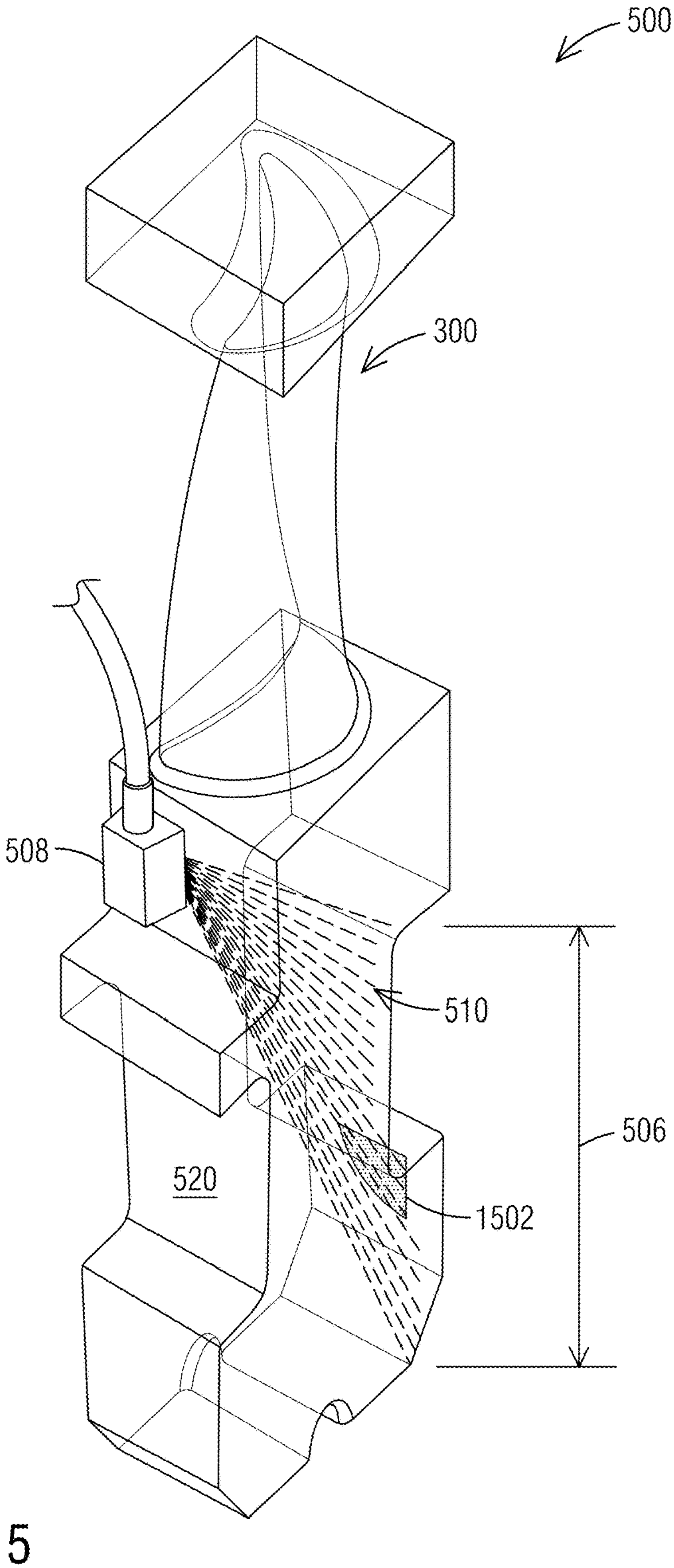
FIG. 15 illustrates an internal view of a turbine blade scanned by a system in accordance with one embodiment.

FIG. 15 is a perspective view of turbine blade 300 with a probe 508. The probe 508 has a sweep angle 506 which produces a cone or polygonal shape as seen in FIG. 15 and FIG. 5A in the vertical direction. Additionally, the wave path 510 can have a horizontal sweep angle 506 that can include a portion or the entire horizontal width of the blade root 520 of an individual turbine blade 300, as shown by the reflection area 1502 seen in FIG. 15.

Figure 16:
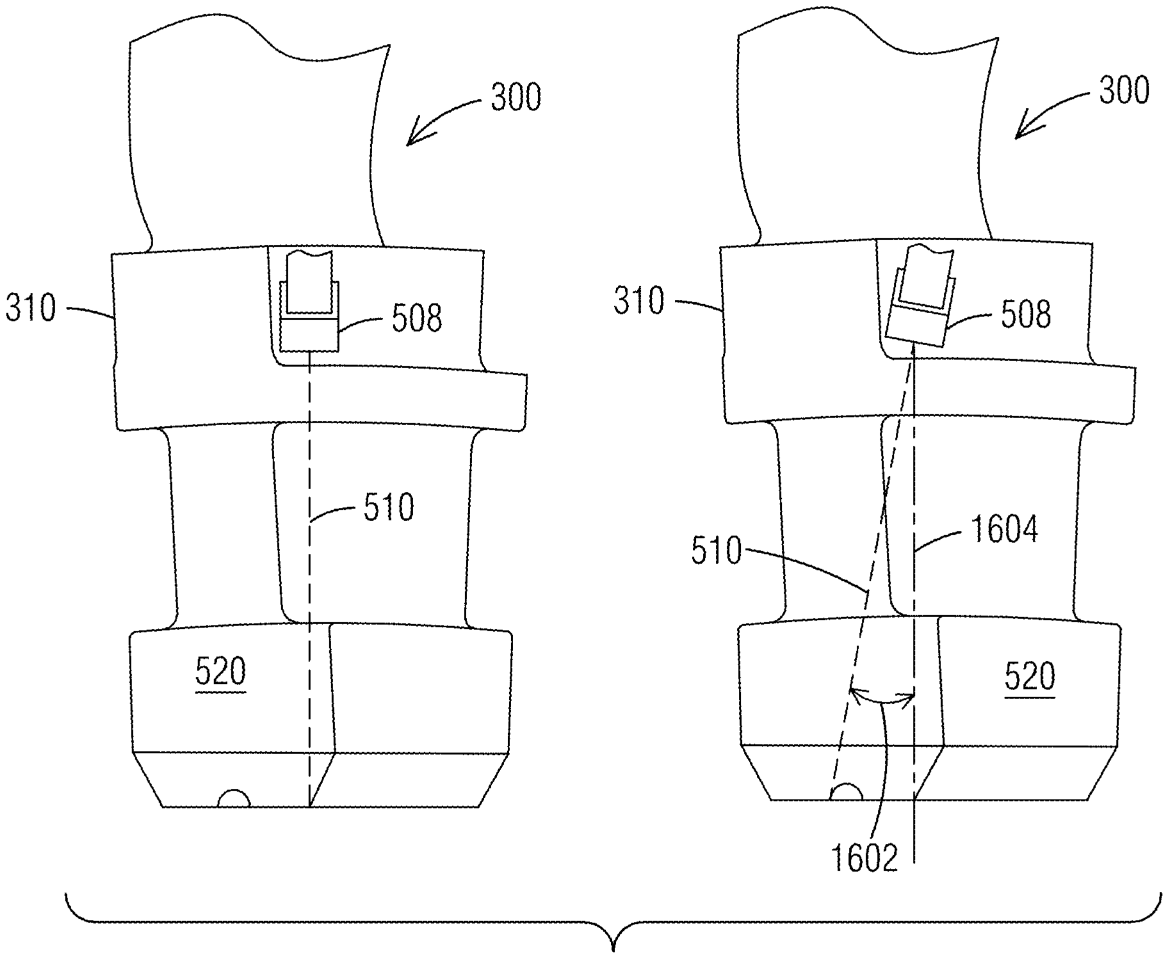
FIG. 16 illustrates an offset angle of a probe in accordance with one embodiment.

The wave path 510 can be adjusted by the location of the probe 508 on the inlet or outlet face of the platform 310 and various probes can have wider or narrower sweep angles 506. Depending on the shape, cone, polygonal, etc., of the wave path 510, the relative angle of the probe 508 to a vertical centerline can help to position the wave path 510 in position to reflect off of desirable locations on the blade roots 520. In one embodiment the probe 508 has a 0-degree offset from a vertical centerline 1604 and in another embodiment the probe 508 has an offset angle 1602 of 20 degrees from the vertical centerline 1604, see FIG. 16. As seen in FIG. 8, the mount 806 can incorporate an offset angle 1602 relative to a vertical centerline 1604 that passes through the longitudinal axis 106. Testing has shown that an offset angle 1602 within a range of 0 to 10 degrees is beneficial for inspecting the entire blade root 520 of a turbine blade 300. Higher skew angles can also be achieved using specific probe(s) in a horizontal scanning mode. The angle of the probe is chosen so that the beam is directed at the area of fillet 208 and the beam sweep is chosen to cover the width of the blade root. The probe is kept perpendicular to the inlet and outlet faces, as well as the vertical center line 1604. This is useful for blade roots with limited surface area for probe positioning.

Figure 17:
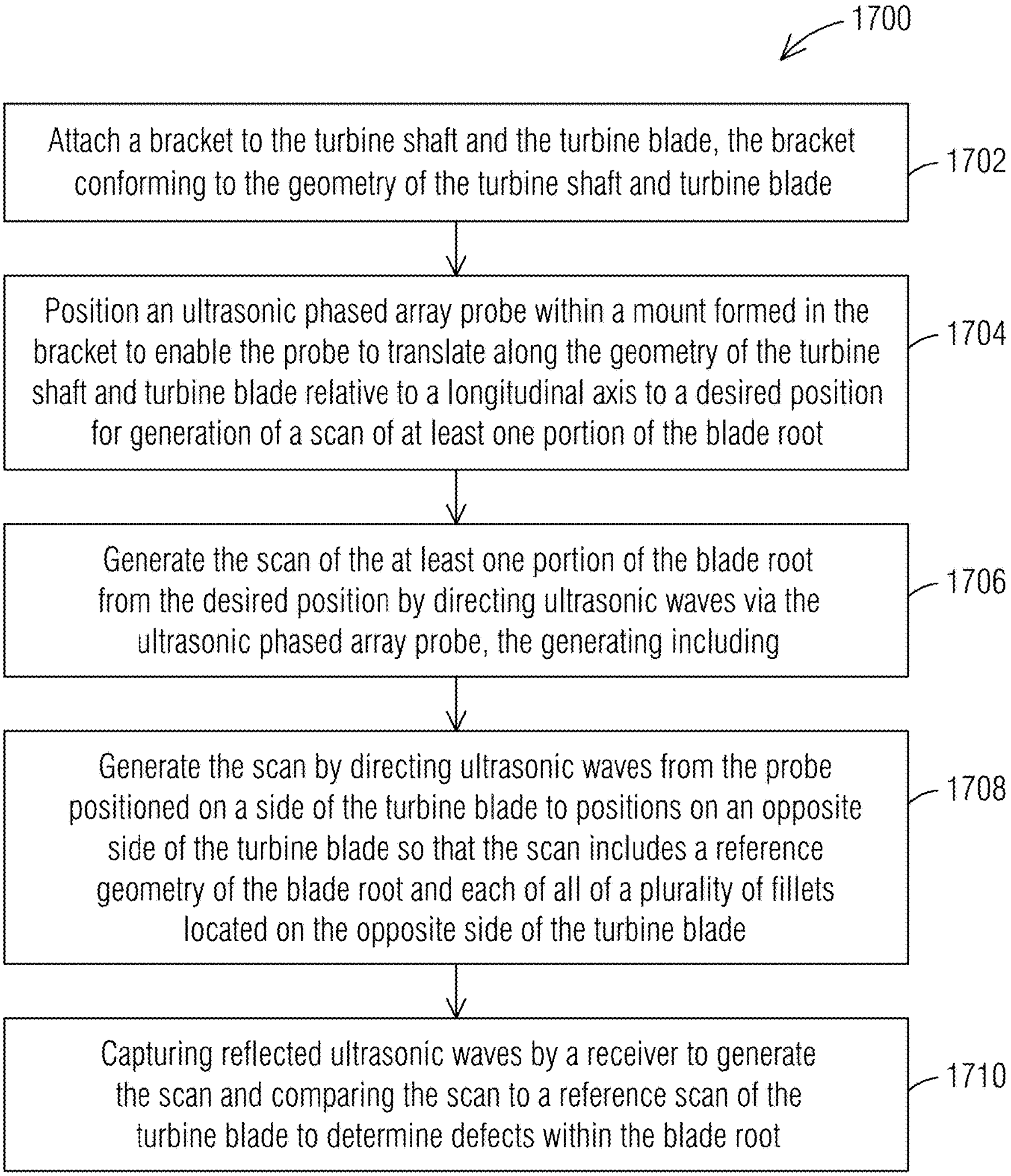
FIG. 17 illustrates a routine 1700 in accordance with one embodiment.

A method in accordance with an embodiment of the present invention is shown in FIG. 17. In block 1702, routine 1700 attaches a bracket to the turbine shaft and the turbine blade, the bracket conforming to the geometry of the turbine shaft and turbine blade. In block 1704, routine 1700 positions an ultrasonic phased array probe within a mount formed in the bracket to enable the probe to translate along the geometry of the turbine shaft and turbine blade relative to a longitudinal axis to a desired position for generation of a scan of a least one portion of the blade root. In block 1706, routine 1700 generates the scan of the at least one portion of the blade root from the desired position by directing ultrasonic waves via the ultrasonic phased array probe. In block 1708, routine 1700 generates the scan by directing ultrasonic waves from the probe positioned on a side of the turbine blade to positions on an opposite side of the turbine blade so that the scan includes a reference geometry of the blade root and each of all of a plurality of fillets located on the opposite side of the turbine blade. In block 1710, routine 1700 captures reflected ultrasonic waves by a receiver to generate the scan and comparing the scan to a reference scan of the turbine blade to determine defects within the blade root.

Figure 18:
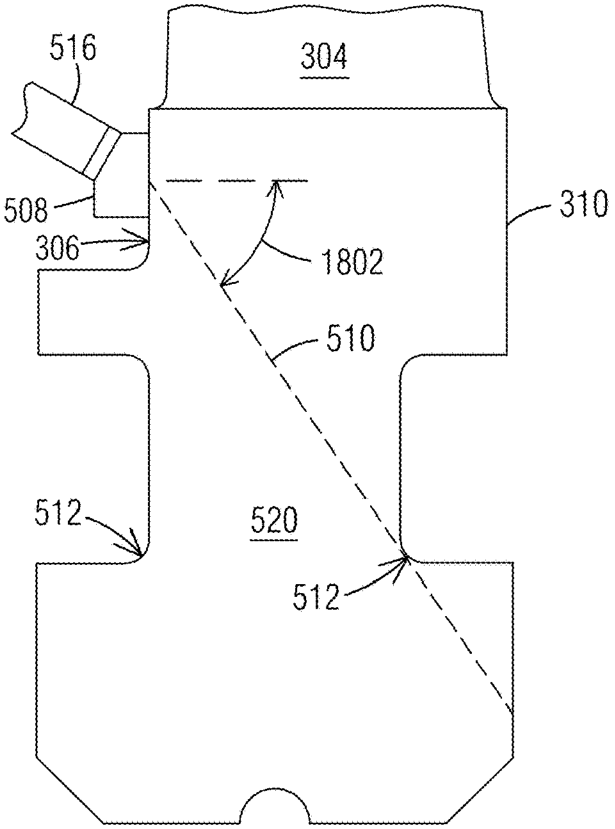
FIG. 18 illustrates a cross sectional view of a blade root in accordance with one embodiment.

An embodiment seen in FIG. 18 discloses a probe 508 that has a zero offset angle 1602 relative to a vertical centerline 1604 and is placed on a face of the blade root 520, shown on the inlet face 306. The wave path 510 of probe 508 has a probe angle 1802 that is fixed within the particular probe 508 used for an application. As seen in FIG. 18 the probe angle 1802 is 58 degrees relative to a plane perpendicular to the inlet face 306 of the platform 310 of the blade root 520 and is aimed at the fillet 512 or area of interest 408 on the outlet side of the load bearing portion 518 of the blade root 520. The probe angle 1802 can be increased or decreased depending on the application. This probe configuration is referred to as horizontal scan because the probe 508 is designed to electronically skew or offset the wave path along the plane created by the probe angle 1802, see FIG. 19, i.e. sweeping or scanning the wave path 510 across the relative horizontal plane (with respect the inlet face 306 or outlet face 308) created by the probe angle 1802. As an alternative to physically skewing the probe in applications that are size/area restricted, the horizontal scan method, in conjunction with a vertical scan, can reduce or eliminate the need to translate across the entire inlet or outlet face of the blade root 520.

Figure 19:
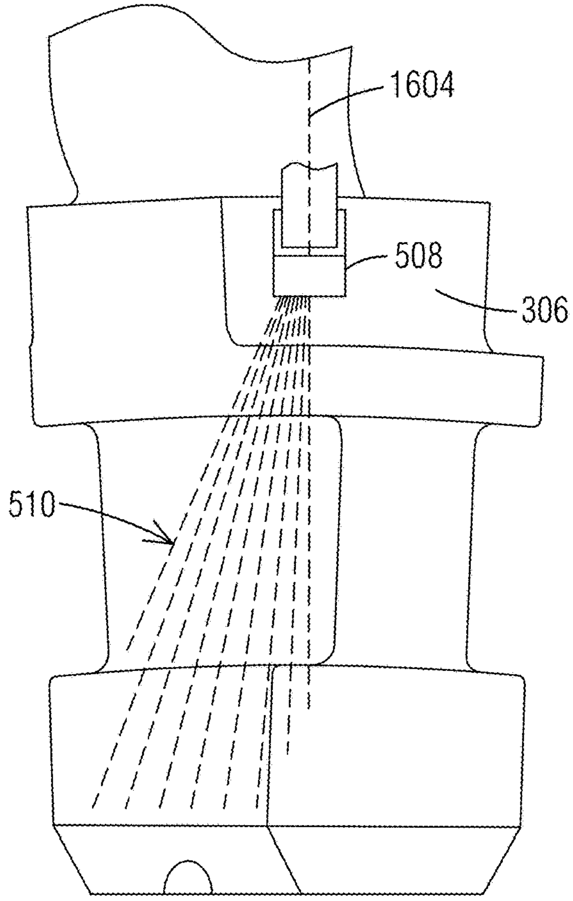
FIG. 19 illustrates an elevated view of the embodiment of FIG. 18.

As seen in FIG. 19 the wave path 510 sweeps out in the horizontal plane defined by the inlet face 306 or outlet face 308 in addition to being aimed at the fillet 512 or area of interest 408 of the blade root 520 on the opposite side of the turbine blade 300 at a probe angle 1802.

Figure 20:
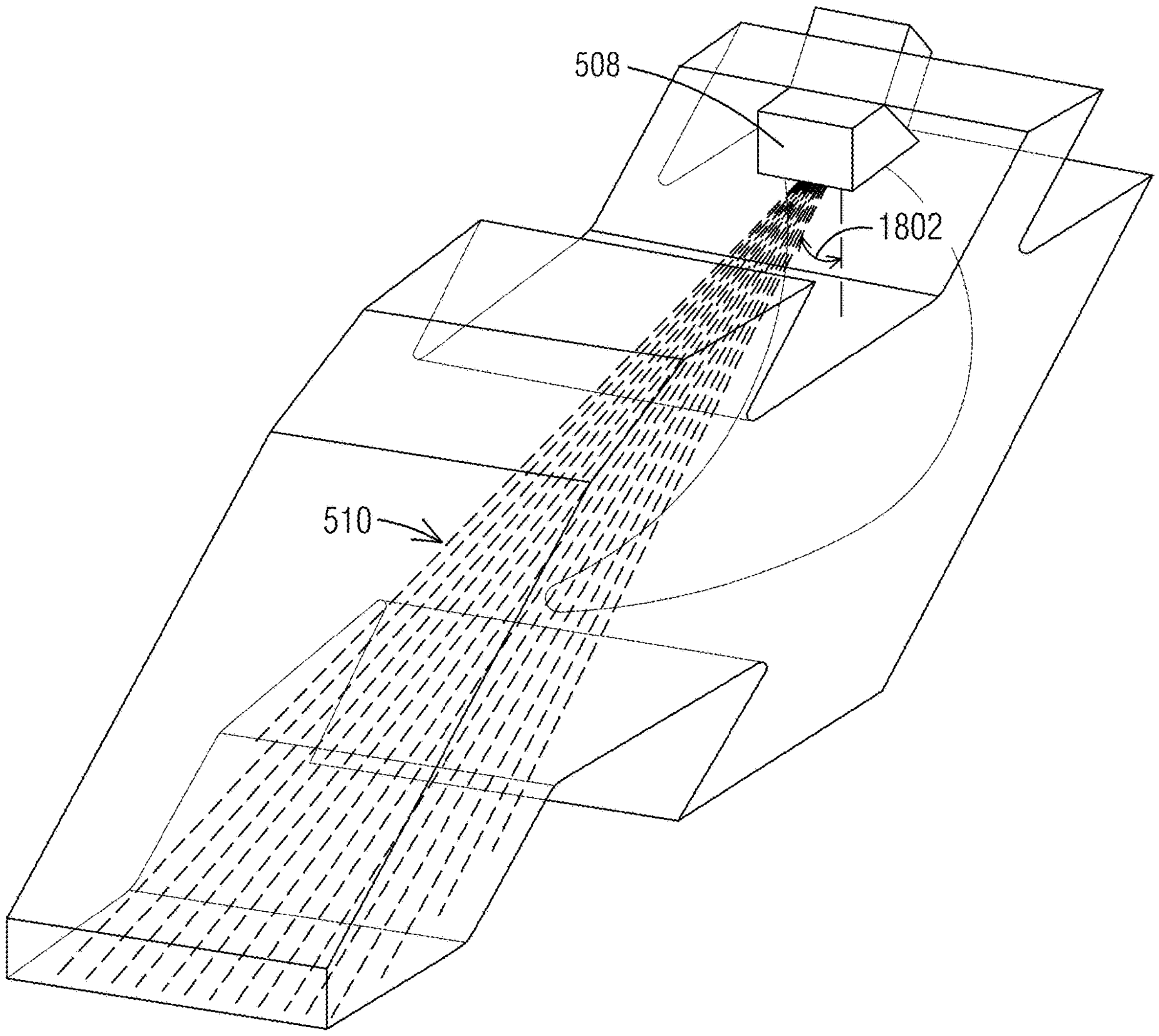
FIG. 20 illustrates an elevated view of an embodiment of the present invention.

FIG. 20 shows an elevated view of an embodiment of the horizontal scan probe configuration which shows the horizontal sweep of the wave path 510 as well as the probe angle 1802 which aims the wave paths 510 to an area of interest 408.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for a volumetric examination of a blade root of a turbine blade, comprising:

an ultrasonic phased array probe;

a bracket defining a fixture, the bracket carried by and conforming to the geometry of a turbine shaft, wherein the probe is positioned within the fixture to position the probe to a desired position for generation of a scan of a portion of the blade root, wherein the probe is positioned within the fixture to position the probe to a desired offset gap for generation of the scan of the portion of the blade root, wherein the probe is positionable within the fixture to direct a wave in a direction to allow for scanning the portion of the blade root of the turbine blade;

an ultrasonic signal source connected to the probe via a line that provides an ultrasonic pulse signal; and a receiver connected to the probe via the line for receiving reflected ultrasonic pulse signals, wherein the scan of the portion of the blade root is generated from the reflected ultrasonic pulse signals, wherein the bracket is sized to fit between a first turbine stage and a second turbine stage of the turbine shaft and translates around the turbine shaft relative to a longitudinal axis, wherein the scan of the portion of the blade root is initiated from at least one of the inlet side or the outlet side of the blade root, wherein the bracket is configured to translate circumferentially around the turbine shaft while maintaining the probe at the desired offset gap relative to a plurality of turbine blades installed in the turbine shaft to generate a continuous scan across multiple blade roots.

2. The system of claim 1 wherein the blade root of the turbine blade is a T-root configured to be mated with a T-slot in the turbine shaft.

3. The system of claim 2, wherein the portion of the blade root includes at least one fillet.

4. The system of claim 1, wherein the portion of the blade root that is in the scan is located on the opposite side of the turbine blade than the side of the turbine blade that the scan was initiated.

5. The system of claim 1, wherein the bracket conforms to a feature of an outer diameter of the turbine shaft.

6. The system of claim 5, where in the feature of the turbine shaft is a sealing feature.

7. The system of claim 5, wherein the bracket further comprises a scanning side and an offset gap between the scanning side of the bracket and the inlet or outlet side of a platform of the turbine blade.

8. The system of claim 7, wherein the bracket further comprises a plurality of rollers that allow for radial translation of bracket about an outer diameter of the turbine shaft relative to the longitudinal axis and define a bracket offset gap.

9. The system of claim 8, wherein the probe mount defines an offset angle between an orientation of the probe and a plane perpendicular to the inlet or outlet side of the blade root of the turbine blade and colinear with a longitudinal axis of the turbine shaft.

10. The system of claim 9 where in the offset angle is within a range of 0 to 20 degrees.

11. The system of claim 1, wherein the bracket further comprises a probe mount that is positionable within in the fixture to define a probe offset gap.

12. A nondestructive method for a volumetric examination of a blade root of at least one turbine blade while the turbine blade is installed in a turbine shaft of a steam turbine, the method comprising:

attaching a bracket to the turbine shaft and the turbine blade, the bracket conforming to the geometry of the turbine shaft and turbine blade;

positioning an ultrasonic phased array probe within a mount formed in the bracket to enable the probe to translate along the geometry of the turbine shaft and turbine blade relative to a longitudinal axis to a desired position for generation of a scan of a least one portion of the blade root, generating the scan of the at least one portion of the blade root from the desired position by directing ultrasonic waves via the ultrasonic phased array probe, the generating including:

generating the scan by directing ultrasonic waves from the probe positioned on a side of the turbine blade to positions on an opposite side of the turbine blade so that the scan includes a reference geometry of the blade root and each of all of a plurality of fillets located on the opposite side of the turbine blade, and capturing reflected ultrasonic waves by a receiver to generate the scan and comparing the scan to a reference scan of the turbine blade to determine defects within the blade root, configuring the bracket to translate circumferentially around the turbine shaft while maintaining the probe at the desired offset gap relative to a plurality of turbine blades installed in the turbine shaft, and generating a continuous scan across multiple blade roots.

13. The method of claim 12 further comprising the step of translating the bracket around the turbine shaft relative to the longitudinal axis to produce a scan of all of the turbine blades installed in a turbine stage of the turbine shaft.

14. The method of claim 12 wherein the desired position of the ultrasonic phased array probe is on an inlet or outlet side of a platform of the turbine blade.

15. The method of claim 12 further comprising the step of scanning a reference geometry to establish a location within the blade root of the turbine blade.

16. The method of claim 15 further comprising the step of distinguishing between a first turbine blade and a second turbine blade by the repetition of the corresponding reference geometry in the scan.

17. The method of claim 16 wherein the reference geometry is a reference fillet.

* * * * *